UNITED STATES PATENT OFFICE.

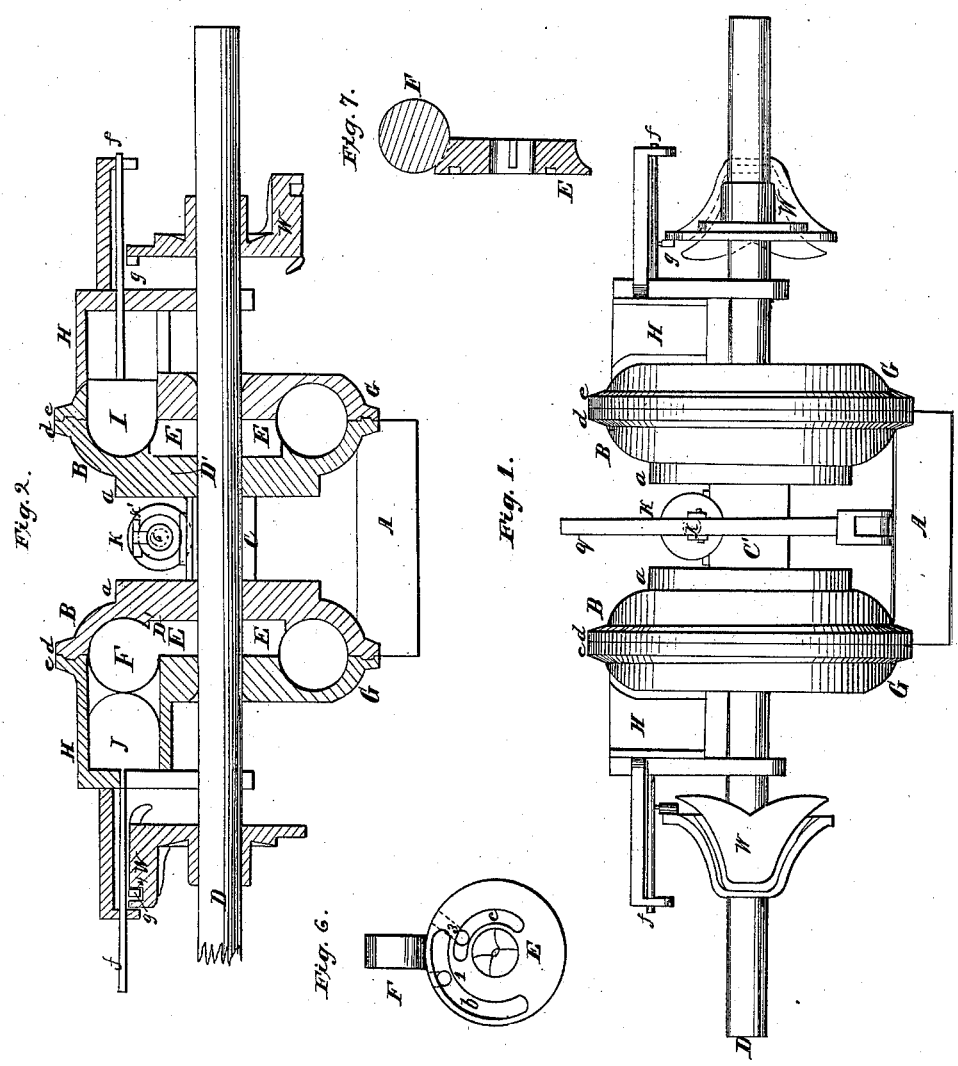

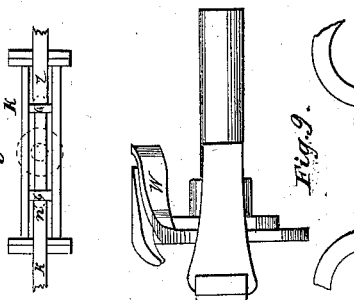
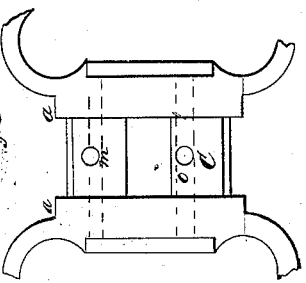
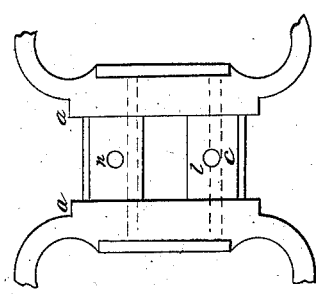
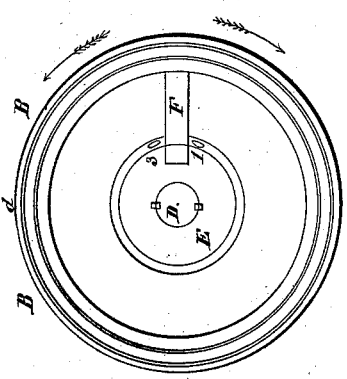
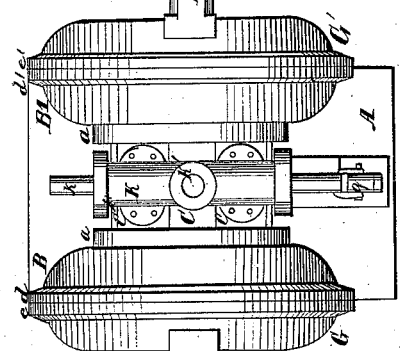
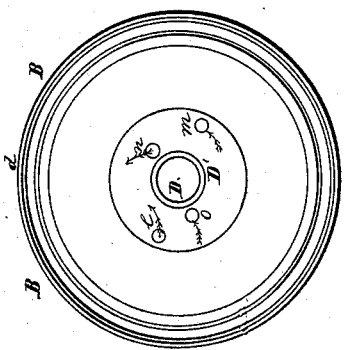
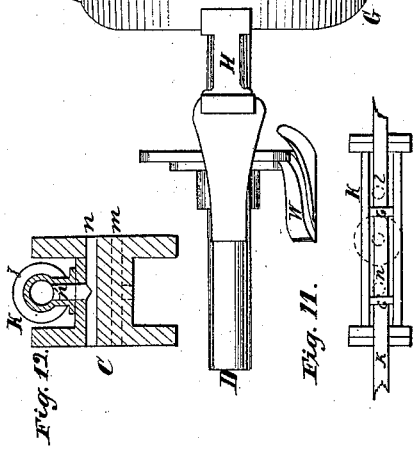
E. Ferren,
Rotary Steam Engine.
N°. 3,338. Patented Nov. 15, 1843.
2 Sheets—Sheet 2.
Witnesses:
W. Serrell
Lemuel W. Serrell
Inventor:
Ebenr Ferren

EBENEZER FERREN, OF HAVERHILL, NEW HAMPSHIRE.

ROTARY STEAM-ENGINE.

Specification of Letters Patent No. 3,338, dated November 15, 1843.

*To all whom it may concern:*

Be it known that I, EBENEZER FERREN, of Haverhill, in the county of Grafton and State of New Hampshire, have invented a new and useful Improvement in Rotary Steam-Engines; and I do hereby declare that the following is a full, clear, and exact description thereof, reference being had to the accompanying drawing, which forms a part of this specification, in which—

Figure 1, is a side elevation; Fig. 2, a vertical section; Fig. 3, top plan; Fig. 4, one half of the shell or case in which the piston revolves; Fig. 5, shell with piston in place; Figs. 6 and 7, piston detached; Figs. 8 and 9, top and bottom view of steam chest; Figs. 10 and 11, valves for reversing motion. Fig. 12 is a section showing the steam ways on one side.

The nature of my invention consists in forming a rotary engine with two pistons, revolving with the shaft in two separate chambers; the steam being let on, so as to cause them to revolve in either direction, and cut the steam off at any point of the revolution.

The construction of my engine is as follows: Each of the steam chambers are annular, and are composed of two disks B and G. The disks have flanges (*d* and *e*) around their outer circumference, in one of which a groove is cut, with a ring fitting into it, which projects from the other flange, on the disk opposite; the cross section of the steam chamber may be circular as shown in the drawing, Fig. 2, or any other form; the constructor may fancy. The two chambers thus formed are placed side by side, a sufficient distance apart to admit the steam ways between them. A short cylinder C surrounds the shaft D, on each end of which there is a flanch (*a*), that is screwed to the steam chamber or may be cast thereto; a projection C′ is formed on each side, in which the steam ways are formed opening into a circular recess D′ formed in the disk and shown in Figs. 12 in section and 4, front view; they are four in number, two of them (*l* and *m*) are placed near the circumference of the recess, the induction way (*l*) being on one side of the shaft, and the eduction way (*m*) on the opposite side, at the same distance from the center. Above the eduction way (*m*) is another induction way (*n*) a little nearer the center of the shaft, and opposite to it another eduction way (*o*). Into the recess D′ a circular disk E is fitted, that projects out beyond it, far enough to form the portion of the steam chamber, that is cut away by the recess; to this disk the piston F is firmly attached, which moves around in the steam chamber. The face of the disk has two slots cut in it, in the form of a segment of a circle concentric with the shaft, one being placed nearer the shaft than the other, to correspond with the holes or steam ways in the recess; these slots are made longer or shorter, as the steam is to be used more or less expansively; from each of these slots there is an opening into the steam chamber at 1, 3; but on opposite sides of the piston. The induction ways (*l* and *n*) run straight across from one chamber to the other and are intersected by a vertical aperture from above, Fig. 12, *n′*; the eduction ways are similar, but have thin openings below. See dotted lines. A cylinder K is fastened across over the shaft to the projections C′, and opens into each of the induction ways above described; the pipe from the steam boiler enters this cylinder at the center K. Two pistons *b*, *b*, are fitted to the cylinder, and connected together by a rod (*k*); these pistons, when equidistant from the center of the cylinder K, just cover both of the induction ways, as in Fig. 10, but when moved either way they open one of them, as shown in Fig. 11. When the engine is at rest the pistons *b*, *b*, are in the position shown in Fig. 10, covering both induction ways; to start it, the pistons are moved to the position shown in Fig. 11, so as to allow the steam a free passage through the aperture (*n*) into the steam chamber, on one side of one of the pistons; this forces it around, till the end of the slot in the disk E passes the hole (*n*), and it is closed; at which time the steam is allowed to work expansively; the other piston is next acted on by the steam (it being on the opposite side of the shaft and in the other steam chamber) the length of time its slot is passing the steam way, the slot in the opposite piston opening into the eduction way (*o*) at which the steam escapes; the steam is thus operating alternately, first on one piston, and then the other.

On the upper side of the steam chamber there is a projection cast, lettered H, in which a recess is formed to receive a head valve I, which just fits the recess, and slides into, or out of it, to stop the chamber, and for the steam to act against; it is drawn back to let the piston pass, which is effected by a rod (*f*) attached to the valve, and projecting through the recess, parallel with the shaft; on the side of this rod there is a stud, on which a friction roller is placed; and on the shaft, outside the steam chamber, on each side, there is a cam W which draws back the valve, and, after the piston passes, closes the valve again; this takes place while the eduction valve is open, at which time there is no strain upon it.

What I claim as my invention and desire to secure by Letters Patent is—

1. The combination of the slots (*b* and *c*) in the disk E (to which the piston is attached and which works in the recess containing the steam ways) with the four holes (*l, m, n, o,*) in the recess; two for ingress, and two for egress, as herein described, so as to allow the steam to be cut off and work expansively.

2. I also claim in combination with the above the pistons *b* and cylinder K constructed and arranged in the manner and for the purpose herein set forth, so as to let the steam onto both steam chambers by one operation, their action being regulated by the disk.

EBENR. FERREN.

Witnesses:
JOHN COLEMAN,
J. J. GREENOUGH.